Oct. 29, 1968   C. R. BONNELL   3,407,659
LIQUID-WEIGHT DATA TRANSMITTER
Filed April 5, 1966   2 Sheets-Sheet 1
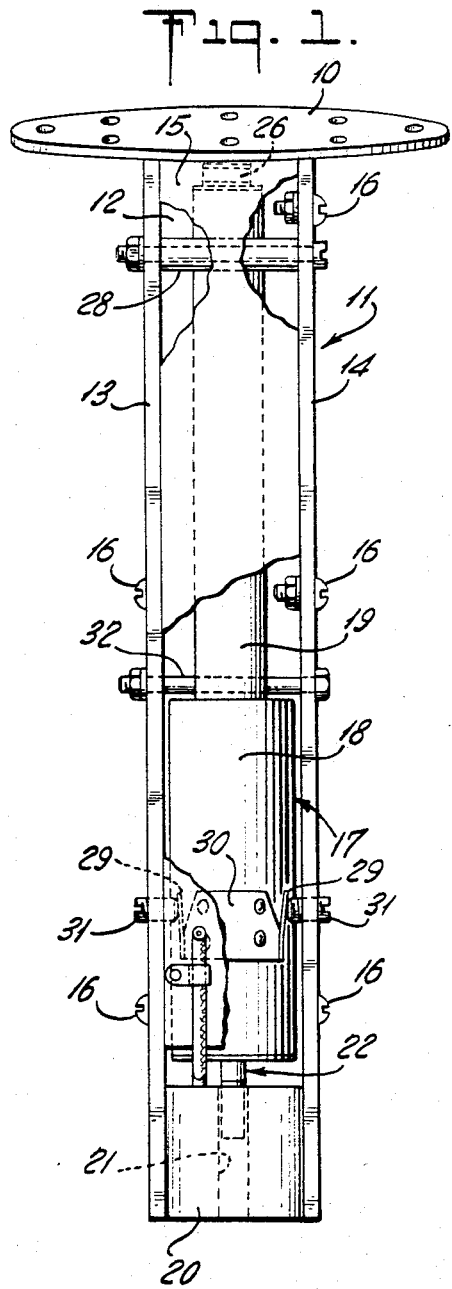
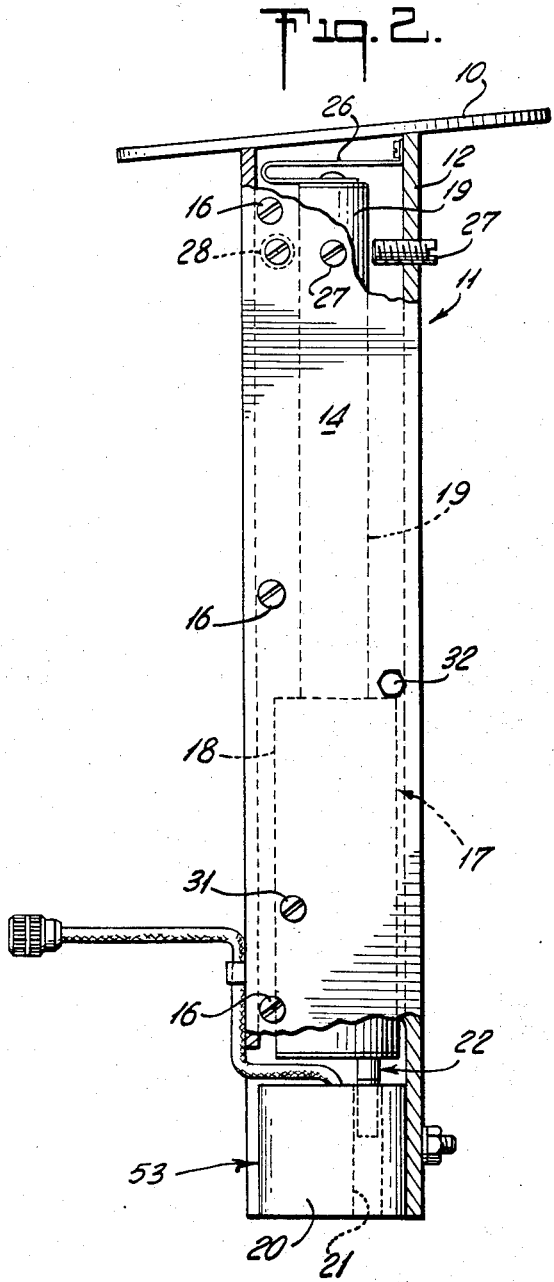
INVENTOR
CHARLES ROBERT BONNELL
BY
Hopgood & Calimafde
ATTORNEYS Oct. 29, 1968     C. R. BONNELL     3,407,659
LIQUID-WEIGHT DATA TRANSMITTER
Filed April 5, 1966     2 Sheets-Sheet 2
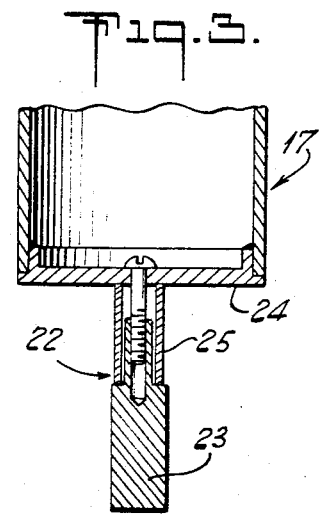
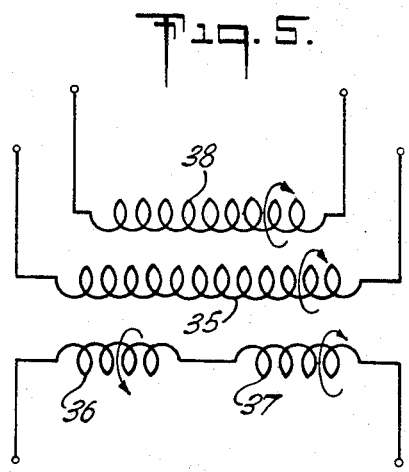
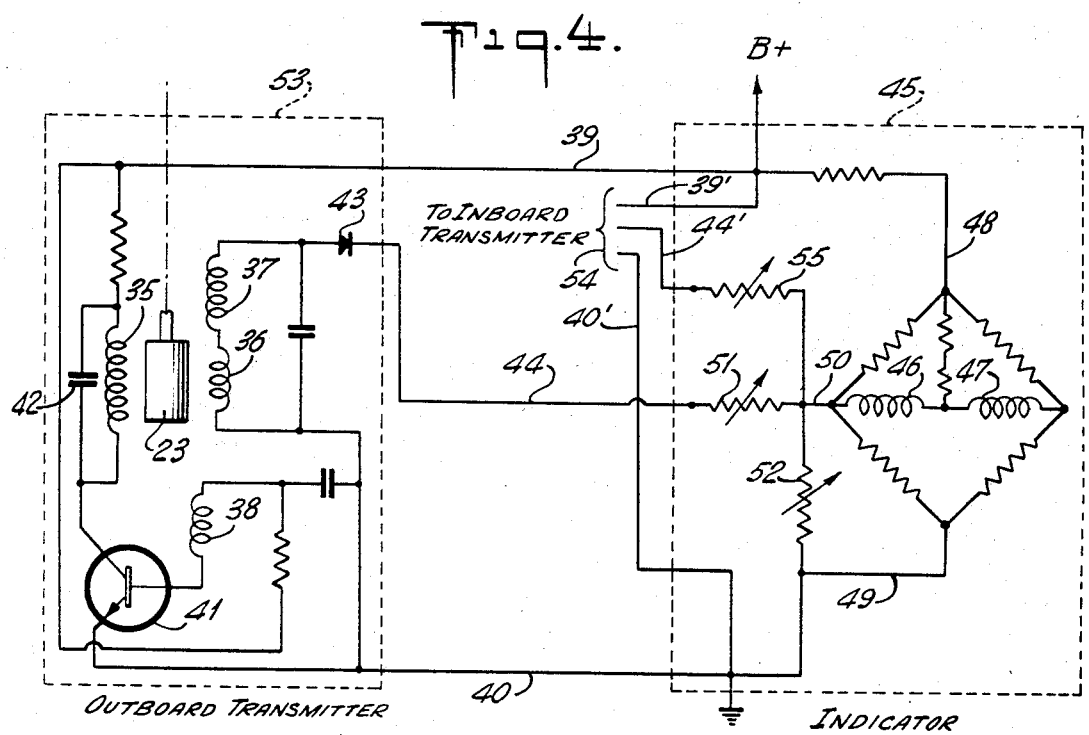
INVENTOR
CHARLES ROBERT BONNELL
BY
Hopgood & Calimafde
ATTORNEYS

United States Patent Office

3,407,659
Patented Oct. 29, 1968

3,407,659
LIQUID-WEIGHT DATA TRANSMITTER
Charles Robert Bonnell, Wichita, Kans., assignor to Electronic Communications, Inc., a corporation of New Jersey
Filed Apr. 5, 1966, Ser. No. 540,368
9 Claims. (Cl. 73—309)

ABSTRACT OF THE DISCLOSURE

A buoyant probe member having a ferro-magnetic element at one end is suitably supported and guided within a differential transformer coil means for relative small displacement in response to liquid levels. The buoyant probe is of known volume and density to measure the product of specific gravity and depth (i.e., weight), and is so proportioned so as to report liquid contents in terms of weight rather than volume. The transmitter unit is adapted for easy installation in airplane fuel tanks and includes local oscillator excitation means and mounting flange means.

---

My invention relates to an improved means for measuring and remotely indicating the weight of liquid contained in a reservoir. The invention has particular utility as a fuel-weight gauge for accurately reporting the weight of fuel remaining in a tank or tanks of an airplane.

Typical present systems for reporting the contents of fuel or other liquid reservoirs exhibit certain disadvantages. Those that respond to liquid volume can give misleading information under widely varying temperature environments, which can cause density variations sufficient to present a misleading report of available fuel. Those which rely on electrical capacitance elements to detect dielectric changes (due to changes in liquid level), and those which employ variable potentiometers to reflect changes in liquid level, are subject to the criticism that they present open or exposed electrical elements as a constant source of danger, in any inflammable environment. Also, the need in some of these systems to employ remote transmission of A-C excitation and output voltages always presents the danger of possible undesirable induced voltage conditions in hazardous environments, as encountered in aircraft-wing tanks and the like.

It is, accordingly, an object of the invention to provide an improved system for remotely reporting the contents of a liquid reservoir, independent of changing environmental temperature and independent of the density of the particular liquid in the reservoir.

Stated in other words, it is an object to provide an improved liquid-measuring and reporting system which will inherently report the weight of liquid remaining in the reservoir.

It is a general object to meet the above objects with a device which is rugged and self-contained at the liquid-probe location, which employs only direct-current voltage for excitation and for reporting output, and which correctly provides its remote indication substantially independent of variations in the level of D.-C. voltage supply.

Other objects and various further features of novelty and invention will be pointed out or will occur to those skilled in the art from a reading of the following specification in conjunction with the accompanying drawings. In said drawings, which show, for illustrative purposes only, a preferred form of the invention:

FIGS. 1 and 2 are front and side elevations, respectively, of a liquid-weight data transmitter of the invention, parts being broken away and sectioned, to reveal contents;

FIG. 3 is an enlarged fragmentary sectional view of one end of the buoyancy member in the device of FIGS. 1 and 2;

FIG. 4 is an electrical diagram schematically showing circuit elements in the device of FIGS. 1 and 2, as well as cooperating elements involved in a remote display of the output of said device; and FIG. 5 is a diagram schematically illustrating the relative longitudinal placement of winding elements in the device of FIGS. 1 and 2.

Briefly stated, the invention contemplates a compact and rugged, unit-handling liquid-weight data-transmission device, complete with mounting flange, and local electrical oscillator and rectifier elements, so that installation can be easily accomplished both in the mounting (as in an airplane fuel tank) and in the making of remote electrical connections. The transmitter employs a buoyancy element or probe of known volume and density to measure the product of specific gravity and depth (i.e., weight); this element is guided for relatively small displacement over the entire range of liquid levels in which it is to respond, and is so proportioned as to report liquid contents in terms of weight rather than volume.

Referring to FIGS. 1 and 2 of the drawings, the device is seen to comprise an elongated hollow casing with a mounting flange 10 at one end. The casing may be cylindrical but in the form shown is rectangular in cross-section, consisting of an elongated channel 11 having a base 12 between spaced side walls 13–14; a removable panel 15 completes the casing and is shown secured by screws (as at 16) to side walls 13–14.

Fully surrounded by the casing is an elongated buoyancy member or probe 17, designed to provide incremental contributions to buoyant force for liquid immersion to any depth along the effective length of member 17. Member 17 is shown to be characterized by plural cross-sections, as at 18 and 19, respectively, said cross-sections being directly proportioned to the corresponding local sections of the liquid reservoir (not shown) in which the device of FIGS. 1 and 2 is to be installed. For wing-tank installation, the mounting flange 10 is secured on a bias angle, as shown, reflecting dihedral angle of the wing, so that the casing and its buoyancy member may be maintained as nearly vertical as possible.

Spaced guide and positioning means are provided to permit only limited freedom for longitudinal displacement of element 17 within the casing, lateral displacement being specifically restrained. At one end, which happens to be the lower end in the form shown, such support and guiding is provided by the potting 20 which may be a suitable epoxy compound permanently containing and supporting the electrical transmission elements. This potting is made with a longitudinal guide bore 21 slidably guiding a projecting end or stud 22 at the base of buoyancy element 17. In FIG. 3, stud 22 is seen to comprise a ferromagnetic element 23 bolted to the base 24 of buoyancy element 17, and held in suitably spaced relation thereto by means of a spacer sleeve 25 of non-magnetic material. The magnetic element 23 cooperates with detector-coil structure contained within potting 20 and surrounding the bore 21, all as will be more fully described.

Further guide and positioning means for member 17 may be provided to react in opposition to buoyant force at the upper end; in the form shown, such reaction means is a compliance, such as leaf spring 26. Spring 26 is secured at one end to the casing wall 12 and at the other end to the member 17. A single bend in spring 26 assures adequate longitudinal compliance, compressionally loaded to oppose increasing buoyancy of member 17; at the same time, spring 26 anchors member 17 against rotation and holds the same against lateral displacement. If desired, auxiliary support means may provide further restraints against lateral displacement, as by angularly spaced low-friction plastic (e.g., nylon) screws 27 and by a bolted plastic sleeve 28. The auxiliary support means may include, similarly, compressionally loaded, generally radially directed spring wipers 29 on a single spring member 30 secured to buoyancy member 17 which may ride on further plastic screws 31 in the casing walls 13–14; adjustment of screws 31 will provide the desired compressional loading at 29. Finally, a bolt 32 between walls 13–14 may be in interfering relation with the shoulder between parts 18–19 of member 17, to provide a desired longitudinal limit to its freedom of movement. Such auxiliary support means restrains and limits member 17 against excessive displacement, including lateral displacement, so that any tendency of projecting element 22 to impact the bore 21 is materially reduced. It will be understood that the casing is free-flooding by way of bore 21 and that if desired other flood ports may be provided; the term "Fluid-communicating" will be understood to apply to such structure features.

Referring to FIGS. 4 and 5, the electrical coil construction within potting 20 may be a series of windings longitudinally symmetrically positioned along the bore 21 to achieve differential-transformer action shown as of the so-called air-core variety. Such windings are shown to include a primary 35, two spaced oppositely-wound but serially connected secondaries 36–37, and a feed-back winding 38. The input to the primary 35 is a D.-C. voltage remotely supplied from a source (labelled B+) over two lines 39–40 by way of a local transistor element 41 which, with tank circuit 35–42 and feed-back control through winding 38, constitutes a local oscillator, supplying A.-C. excitation to the primary 35. Output across the combined secondary windings 36–37 is rectified by a diode 43, for remote transmission by line 44 (with respect to ground line 40) as a D.-C. voltage. It will be understood that, broadly speaking, the described transformer components include a coil the inductance of which is caused to change in accordance with displacement of the magnetic element 23. Specifically, however, in the differential-transformer shown, each of several coils in caused to change its inductance as a function of this displacement; stated in other words, the mutual inductance between the primary winding 35 and each of the secondary windings 36–37 is caused to vary in accordance with the weight and depth of the liquid. It will be appreciated that magnetic element 23 is preferably longitudinally centrally positioned with respect to windings 36–37 for one of its longitudinal limits of displacement and that all other possible positions thereof are on one side only of this central position. That being the case, output voltage in line 44 is zero for the centered or first position limit, and the voltage in line 44 increases with displacement of buoyancy element 17 away from such limiting position.

At the remote location, which may be at the aircraft instrument panel, I show a ratiometer 45 utilizing moving coils 46–47, connected across a suitable resistance bridge. A first input to the ratio-responsive display is provided by the B+ connection to the bridge at point 48, to ground at 49. The second input to the display is from line 44 to point 50 at a corner of the bridge, by way of a suitably adjustable calibrating potentiometer 51, a zero-adjusting potentiometer being shown at 52.

The described indicator lends itself to display of the summed output currents of plural liquid-weight data transmitters. For example, the entire probe and transmitter unit 53 (FIG. 4) may be installed to report liquid weight over an upper range of levels in a wing tank and may thus be installed in an "outboard" location, and a second similar probe and transmitter unit (not shown) may be installed at an "inboard" location in the same tank (i.e., nearer to the fuselage of the aircraft), to report liquid weight for a lower range of levels contiguous to and below the upper range of unit 53. The cable connection 54 to the "inboard" probe and transmitter unit is shown to include ground and B+ lines 40′–39′, and an output line 44′ is fed via a calibration potentiometer 55 to point 50. The ratiometer output will then indicate total weight of liquid detected by both probe-transmitter units.

It will be seen that the system which has been described is direct-reading as to liquid weight. It is inherently rugged and provides no temptation for tampering, being fully self-contained. It presents none of the hazards of exposed electrical elements as in other systems, and provides maximum safety by utilizing D.-C. voltages (at explosion-proof levels) both for supply and report-out functions. Independence of line-voltage fluctuations is promoted by utilizing the same B+ voltage both as the reference and as the primary source for the data signal in line 44.

While I have described the invention in detail for the preferred form shown it will be understood that modifications may be made within the scope of the invention as defined in the claims which follow.

I claim:

1. An electrical transmitter of liquid-weight data, comprising an elongated hollow upright casing with mounting-flange means at one longitudinal end, electromagnetic induction means including a electrical coil and means positioning said coil generally centrally of said casing at one end thereof, said positioning means including a nonmagnetic potting having a cylindrical bore within said coil and aligned parallel to the elongation axis of said casing, an elongated buoyancy member and means coacting with said casing for retaining said buoyancy member against lateral displacement and for limited guided movement within said casing along said elongation axis, said last-defined means including longitudinally yieldable but laterally rigid spring means connected to one end of said buoyancy member and urging said buoyancy member in opposition to a rising displacement of said buoyancy member, said last-defined means also including at one end a longitudinally extending projection of magnetic material slidable within said bore, and fluid-communicating means between the outside and the interior of said casing, whereby when said transmitter is mounted with its axis extending vertically into a liquid reservoir, the electrical inductance of said coil will reflect the weight and depth of the liquid in the reservoir over the range of liquid levels at which said buoyancy member is exposed to liquid.

2. An electrical transmitter of liquid-weight data, comprising an elongated hollow upright casing with mounting-flange means at one longitudinal end, an elongated buoyancy member contained within said casing, longitudinally spaced supports secured to said casing for supporting the opposite ends of said member, said supports each restraining said buoyancy member against lateral displacement but permitting limited axial displacement thereof, one end of said buoyancy member carrying a longitudinally projecting element of magnetic material, one of said supports comprising a potting of electrical elements including coil means positioned on the displacement axis of said magnetic projecting element, said potting having an elongated bore within said coil means and of a size to guidably support said projecting element, another of said supports including reaction means longitudinally reacting between said casing and said buoyancy element in opposition to the buoyant force thereof, and fluid-communicating means between the outside and the interior of said casing, whereby when said transmitter is mounted with its axis extending vertically into a liquid reservoir, the electrical inductance of said coil will reflect the weight and depth of the liquid in the reservoir over the range of liquid levels at which said buoyancy member is exposed to liquid.

3. A transmitter according to claim 2, in which said reaction means includes a leaf spring secured at one end to said casing and secured at its other end to said buoyancy member.

4. A transmitter according to claim 3, in which said leaf spring is folded on an axis transverse to the displacement axis of said buoyancy member, whereby spring compliance is essentially limited to action along the displacement axis.

5. A transmitter according to claim 2, and including radially compliant compressionally loaded auxiliary support means coacting between said one end of said buoyancy member and the adjacent wall of said casing, said auxiliary support means providing freedom for relative longitudinal movement of said buoyancy member and casing, whereby in the presence of vibration said auxiliary support means will reduce any tendency of said projecting element to impact the bore of said potting.

6. A transmitter according to claim 2, in which said coil means comprises a differential transformer whose windings surround the bore of said potting, said projecting element being of effective length less than the effective length of said transformer, A.-C. excitation means for said transformer, and a remote-transmission connection for the output of said transformer.

7. A transmitter according to claim 6, in which said A.-C. excitation means includes oscillator means, and in which said remote-transmission connection includes rectifier means for the output of said transformer, both said oscillator and said rectifier means being contained within said potting, whereby D.-C. supply and output voltages to and from said potted electrical elements may be utilized exclusively.

8. A transmitter according to claim 7, in which said remote transmission connection includes a remotely located ratiometer having two input connections, the D.-C. supply voltage to said oscillator being coupled to one of said input connections, and the output voltage from rectifier means being coupled to the other of said input connections.

9. A transmitter according to claim 7, in which said remote transmission connection includes a remotely located indicating meter responsive to the D.-C. output of said rectifier means.

References Cited

UNITED STATES PATENTS

| 2,576,561 | 11/1951 | Binford. | |
|---|---|---|---|
| 2,911,828 | 11/1959 | Keating et al. | 73—290 |
| 3,154,950 | 11/1964 | Hargens et al. | 73—453 |

FOREIGN PATENTS

| 6,936 | 5/1915 | Great Britain. |
|---|---|---|

S. CLEMENT SWISHER, *Acting Primary Examiner.*

D. M. YASICH, *Assistant Examiner.*